April 13, 1965 R. KLAHN ET AL 3,178,564
DIGITAL TO ANALOG CONVERTER
Filed Dec. 15, 1960 3 Sheets-Sheet 1
FIG. 1
| BINARY SYSTEM | DECIMAL SYSTEM |
|---|---|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
FIG. 2
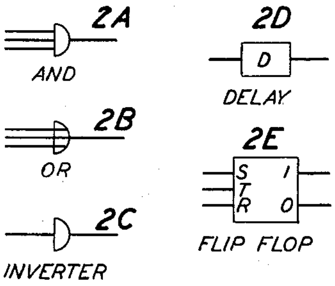
FIG. 3
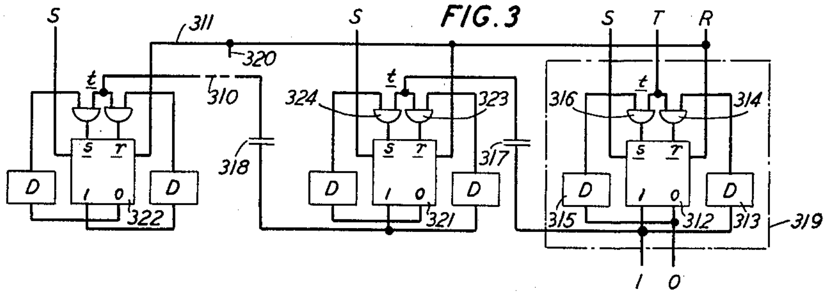
FIG. 7
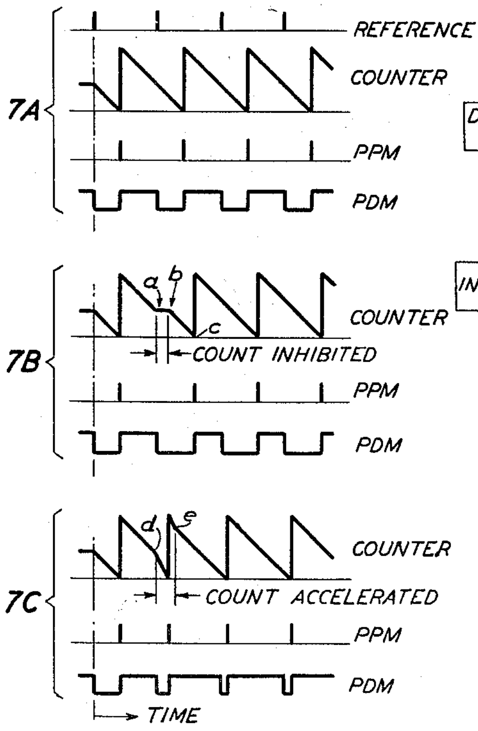
FIG. 4
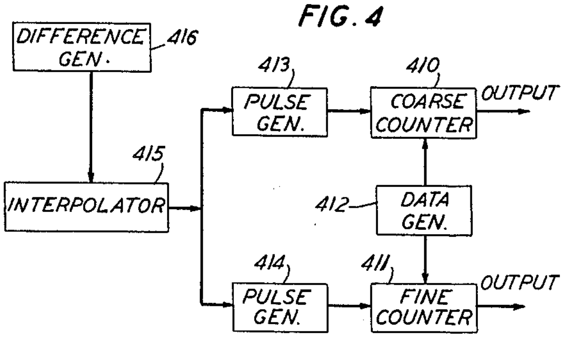
INVENTORS. R. KLAHN
J. C. LOZIER
BY [signature]
ATTORNEY April 13, 1965 R. KLAHN ETAL 3,178,564

DIGITAL TO ANALOG CONVERTER

Filed Dec. 15, 1960 3 Sheets-Sheet 2

INVENTORS. R. KLAHN
J. C. LOZIER
BY [signature]
ATTORNEY

DIGITAL TO ANALOG CONVERTER

Filed Dec. 15, 1960 3 Sheets-Sheet 3

INVENTORS. R. KLAHN
J. C. LOZIER
BY [signature]
ATTORNEY

United States Patent Office
3,178,564
Patented Apr. 13, 1965

3,178,564

DIGITAL TO ANALOG CONVERTER

Richard Klahn, Morris Plains, and John C. Lozier, Short Hills, N.J., assignors to Bell Telephone Laboratories, Incorporated, New York, N.Y., a corporation of New York Filed Dec. 15, 1960, Ser. No. 75,975
7 Claims. (Cl. 235—154)

This invention relates to circuitry for converting digital information to analog information; more particularly, it relates to a digital-to-analog converter wherein the analog output contains signals interpolated in accordance with the difference between successive digits.

It is becoming common practice to transmit information in the form of discrete digital data rather than in analog form. This is true, for example, with respect to pulse code modulation systems. A fundamental requirement in such systems is that the digital data must be returned to analog representations at the receiver. Transmission time is of considerable importance because the less time used to transmit a given amount of information, the more information may be transmitted within a particular frequency band or channel. The use of coding, in itself, enables more efficient use of a transmission band. Still further gains can be made by transmitting basic or raw data and interpolating intermediate data at the receiver.

Whenever data continuously varies, it may be represented by a series of digits, each indicative of the value of the data for a particular point of the variable quantity. For example, if data varies with time, numbers may be transmitted representing specific magnitudes at particular times. If the variations in data magnitude in the intervals between data points are assumed to be continuous, it is possible to interpolate additional data between each pair of data points in order to present a smooth transition from point to point. It will be understood that if the various points are known in advance, it is possible to transmit information concerning the difference between the points and, subsequently, at the receiver use this information to control the interpolation. Even if the points are not known in advance, the variation of preceding data points may be used as an approximation of expected variation concerning subsequent data points.

The concept of interpolating quantities between those already existing is commonly used in the field of mathematics. It will be recalled, for example, that in order to obtain an accurate valuation for logarithms from a logarithmic table showing only four decimal places, it is common practice by means of proportions to ascertain the valuation of a logarithm accurate to five decimal places.

An object of the present invention is to convert digital data to analog data.

Another object of the present invention is to provide a system operative upon successively received data to modify the information at a known or predictable rate in order to produce a substantially correct value at the time of reception of the next information.

Another object of the present invention is to interpolate intermediate data into a series of raw data in order to increase the rate at which output information is updated beyond the rate at which new input information is made available.

The invention provides a system for receiving a series of digital information in conjunction with information concerning the variation in data magnitude between each pair of received digits. By means controlled in accordance with the variation data, the received information is modified to reflect the actual change it must undergo to furnish a smooth transition to the next data point. This system is embodied in a digital-to-analog converter wherein data is registered in accordance with a binary code and is converted to a P.P.M. (pulse position modulated) or P.D.M. (pulse duration modulated) signal representative thereof.

The invention features the use of counting decoders to develop analog signals representative of binary information stored therein.

Another feature resides in means for interpolating data into a series of changing numbers being converted in a counting decoder, in order to modify the numbers to reflect the changes necessary to create a smooth transition from number to number.

Another feature resides in means for converting information concerning the difference between successive data points into a control signal instrumental in modifying the data point being converted until the subsequent data point is received.

Still another feature of the invention resides in means for adapting such interpolation techniques to binary-coded decimal converters.

The invention is disclosed in an illustrative embodiment using subtractive counting decoders to convert successive digital data to P.P.M. or P.D.M. signals representative thereof. Digital data is stored in the counting decoders and the decoders are driven by pulses recurring at a fixed repetition rate. By detecting the first driving pulse and the time at which the counter goes through zero, it is possible to establish a time relationship proportional to the digital data stored. Means are provided as hereinafter described for either inhibiting the driving pulses thereby effectively increasing the representative time, or accelerating the driving pulse repetition rate thereby effectively decreasing the representative time.

Other objects and features of the invention will be more clearly understood and appreciated following the description of the illustrative embodiment made in conjunction with the drawings wherein:

FIG. 1 is a chart showing the binary-to-decimal conversion employed in the illustrative embodiment;

FIG. 2 illustrates the logic symbols used in FIGS. 5 and 6;

FIG. 3 is a logic circuit drawing of typical binary counter stages;

FIG. 4 is a block diagram of the basic components of the invention;

Figure 5:
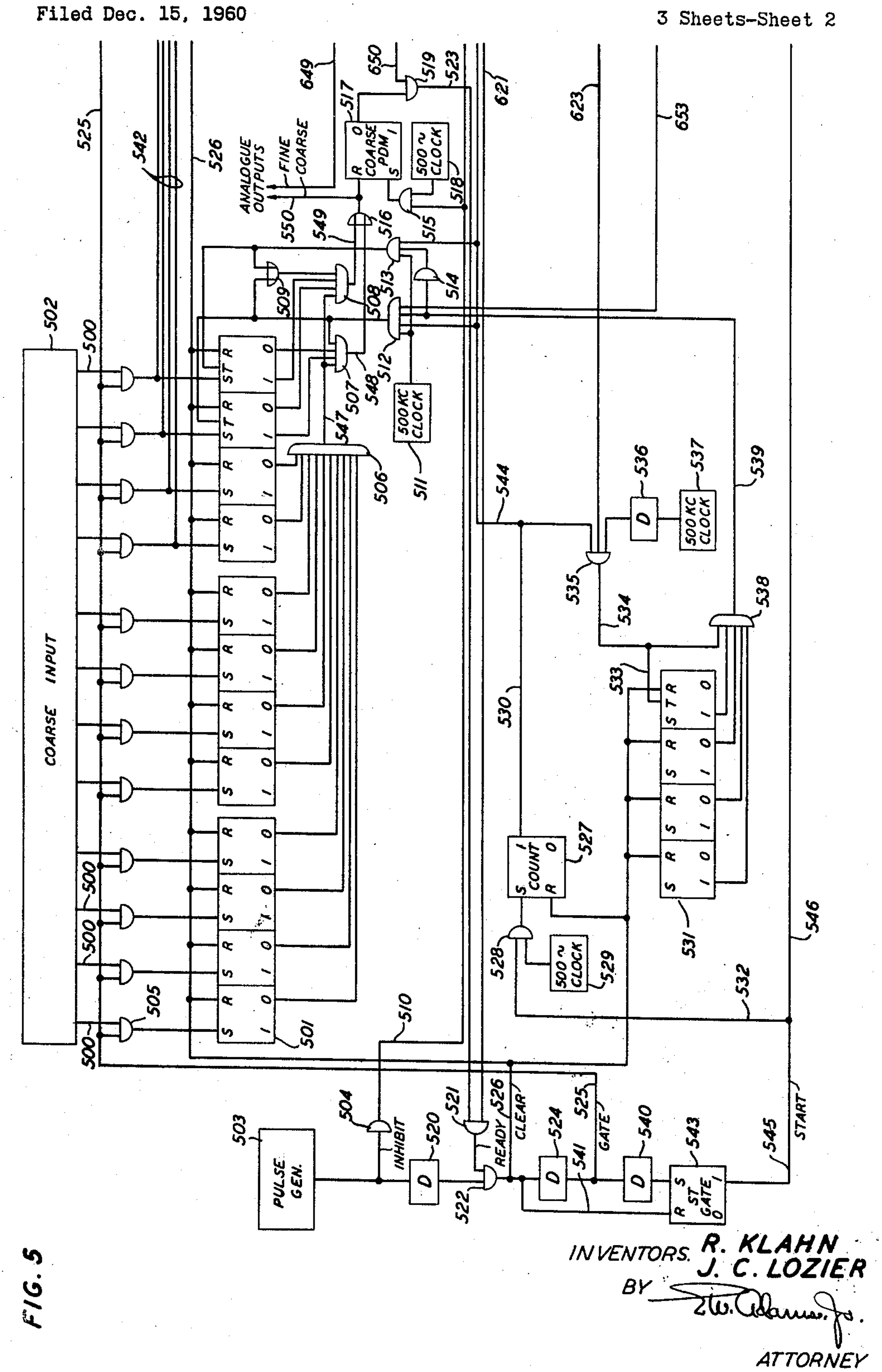
Figure 6:
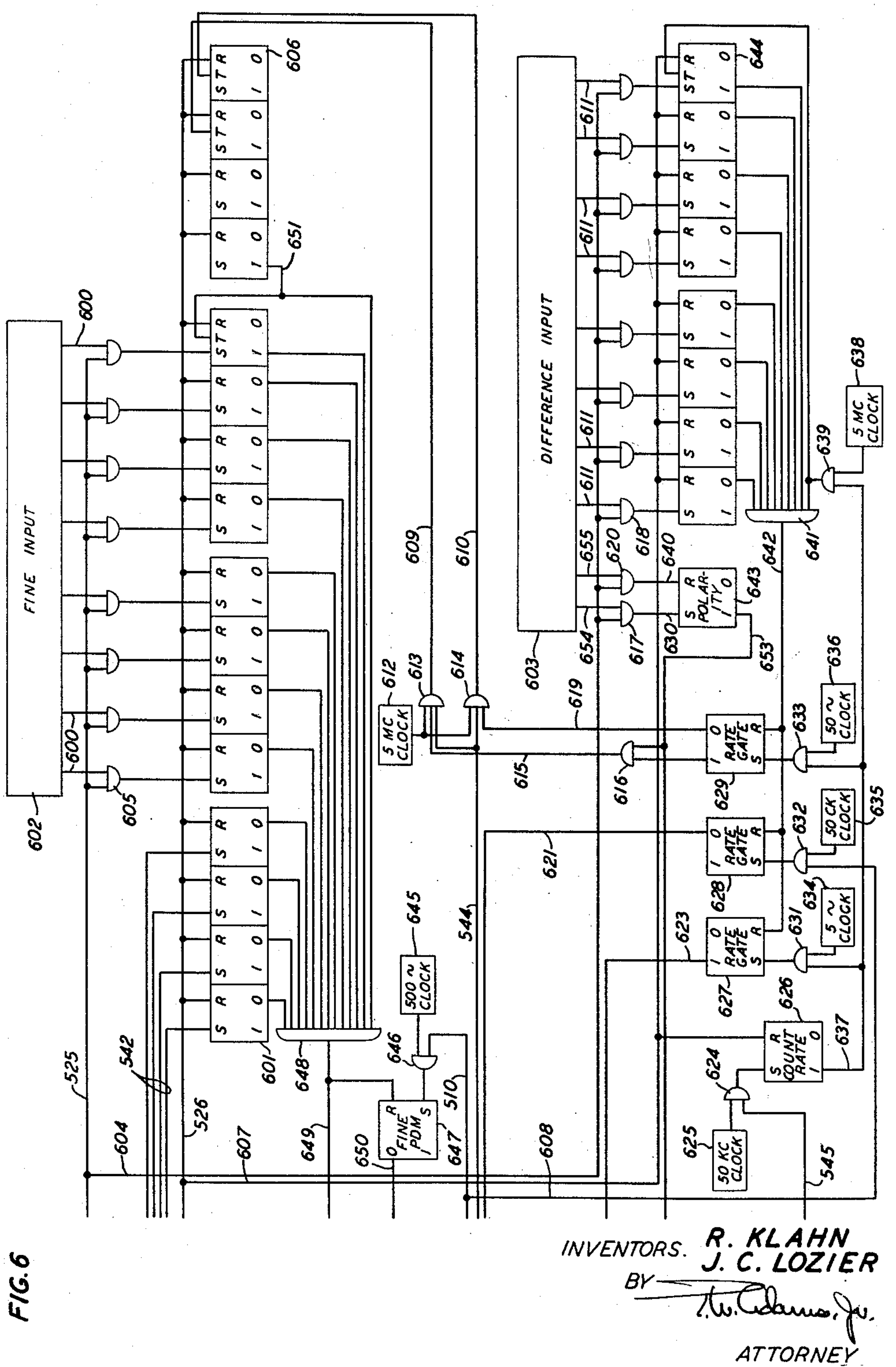

FIGS. 5 and 6 when arranged from left to right, respectively, comprise a logic drawing of a preferred illustrative embodiment; and FIG. 7 is a plurality of waveforms illustrating the principles of operation.

The illustrative embodiment to be described is designed for the conversion of binary-coded decimal digits into P.P.M. or P.D.M. signals. For purposes of illustration, the system has been designed to decode decimal digits in the range from 0 to 99,999. Each decimal digit is represented by four binary digits in accordance with a common binary-to-decimal conversion. In order to yield an output such as might be used to control coarse and fine resolvers or servo-mechanism units, the decoder is arranged in coarse and fine component parts. The first three digits of the decimal number constitute the coarse component and the last three digits constitute the fine component. It will be noted, therefore, that the middle digit is shared by both component groups.

As is generally true of computers, the embodiment uses bistable devices for storage, transfer, and conversion of information. For purposes of description, the standard binary-code representation of decimal digits will be employed. A chart illustrating this representation appears in FIG. 1 of the drawings. It will be recalled that binary digits have decimal values that may be considered ascending from the right digit to the left of $2^0$, $2^1$, $2^2$ ,$2^3$, etc., respectively.

The circuit description to follow is presented in logic form. The particular schematic representations used for the various logic elements are depicted in FIG. 2 wherein: FIG. 2A illustrates a logic AND gate; FIG. 2B illustrates a logic OR gate; FIG. 2C illustrates a logic inverter; FIG. 2D illustrates a delay element, the particular period of which is discussed in the descriptive text; and FIG. 2E illustrates a flip-flop unit in which a pulse applied to the S terminal switches the flip-flop to a "1" state, a pulse applied to the R terminal resets the flip-flop to a "0" state, and a pulse applied to the T terminal switches the flip-flop from whatever state it is in to the other. Any specific means of accomplishing these logic functions which are within the scope of one skilled in the art are acceptable in fabricating the invention. These means might include, for example, electronic tubes, solid-state devices, magnetic devices, electromagnetic devices, or ferrite devices.

The system drawing appearing in FIGS. 5 and 6 comprises, to a large extent, counters containing a plurality of bistable devices. As amplified hereinafter, the bistable devices of these counters, illustrated simply as flip-flops, may contain several more components, such as illustrated, for example, in FIG. 3.

In the illustrative embodiment, subtractive counters are used to convert binary-coded decimal numbers into p.p.m. signals representative thereof. FIG. 3 is a logic drawing of a typical binary subtraction counter. The counter in FIG. 3 contains three distinct stages comprising flip-flops, delay devices, and logic gates; however, any number of stages are possible. Each stage consists of a flip-flop switchable by either a trigger pulse applied directly to an *s* or *r* terminal, or a trigger pulse applied to terminal *t*. Terminal *t* is connected through AND gates to either the *r* or *s* terminal of each flip-flop. Individual delay elements, connected to the outputs of each flip-flop, supply a gating signal to the appropriate AND gate to steer the triggering pulse applied to terminal *t* to the flip-flop input which will cause switching when energized. An understanding of the counter circuit may best be obtained by assuming a number to be stored therein, subsequently applying triggering pulses and analyzing the effect thereof. Although the stage on the left is connected with those on the right via dashed lead 310 and lead 311 with tap 320, it will be assumed that the counter is a three-stage unit.

Let it be assumed that the number 7 is stored in the counter of FIG. 3, that this manifests itself by all three stages residing in the "1" state, and that driving pulses are applied to terminal T in the upper right corner of the figure. Elements 312, 321, and 322 are standard bistable devices, such as electronic or transistor flip-flops. The application of a pulse to terminal *s* is effective to switch the flip-flop to state "1" whereas the application of a pulse to terminal *r* is effective to switch the flip-flop to state "0." Because all stages are in the "1" state, the delay device 313 connected to the "1" output will be applying an input to AND gate 314 connected thereto. Thus, upon application of a pulse to terminal T, AND 314 has its complement of inputs satisfied and a pulse appears at terminal r, switching flip-flop 312 to state "0." The effect of this switching is to remove the signal applied via delay 313 to AND gate 314 and apply a signal via delay 315 to an input of AND 316. Obviously, upon application of the next driving pulse to terminal T, it will be gated via AND 316 to the *s* terminal of flip-flop 312 and consequently set the stage to "1" again. Before the application of such second pulse, however, it will be noted that the counter, as a whole, now registers "110" or the binary representation of the decimal digit 6.

Application of a second trigger pulse to terminal T results in this pulse being gated through AND 316 to terminal *s* of flip-flop 312, setting this stage to the "1" state, and after a fixed delay applying a signal on AND 314 and eliminating the signal on the input of AND 316. Upon flip-flop 312 being switched to the "1" state, a transient pulse is transmitted through capacitor 317 to the second stage and applied through AND 323 to terminal *r* of flip-flop 321. Because the second stage was initially in state "1," AND 323 gates the pulse rather than AND 324. The application of the triggering pulse via capacitor 317 is effective to reset the flip-flop 321 to the "0" state thereby enabling AND 324 in preparation for any subsequent triggering pulses. Examining the state of the counter at this time, it will be noted to be "101" or the binary-code representation for the decimal digit 5.

It should be clear that as each driving pulse is applied to terminal T, the counter subtracts one decimal digit so that the entire content of the counter is one digit less than that previously present therein. The delay elements are chosen to have a period sufficient to permit the stage to switch following application of a driving pulse, and short enough to permit a rapid repetition rate of driving pulses. The stages may be initially set via the leads connected to terminals *s* and designated across the upper portion of the drawing as S. It should be understood that during application of setting pulses via these S leads some means should be provided to prevent interaction between the stages. In order to insure uniformity at the time of setting, the entire counter may be set to zero by the application of a pulse to the *r* terminals of each flip-flop via lead 311. Such a pulse might be termed a reset or clear pulse.

To recapitulate, FIG. 3 illustrates a binary counter which may be initially set by first clearing all stages with a pulse applied to terminal R at the upper right, and subsequently applying setting pulses via the S terminals across the top of FIG. 3. Successive pulses applied on terminal T subtract one decimal digit for each pulse applied. Examination of the "0" and "1" outputs of each stage enables one to tell the number stored in the counter at any instant. It is optional whether the counter is initially set by selectively energizing the *s* terminals and reset by energization of all *r* terminals, or is initially set by selectively energizing the *r* terminals and reset by energization of all *s* terminals.

The right-hand stage in FIG. 3 is enclosed by broken-line block 319 through which six leads extend. The designations on these leads correspond to the designations appearing in the counters symbolically represented in FIGS. 5 and 6 and the functions they perform in FIGS. 5 and 6 will be understood to be identical to those performed in the illustrative counter just described.

The counter illustrated in FIG. 3 is a binary subtracting counter in that it operates in a system of radix 2. To convert such a counter to a decimal subtracting counter, i.e., a counter operative in a system of radix 10, it need merely be modified by means of feedback connections, pulse blocking, pulse advancing, or parallel connections as taught at pages 198 through 208 in "Arithmetic Operations in Digital Computers" by R. K. Richards, published by D. Van Nostrand Company, Incorporated, 1956.

In order to proceed with a consideration of the operations performed in achieving the goals of the invention, assume that the data to be converted comprises five-digit decimal numbers representing the values a quantity assumes every two seconds of time. Thus, each number represents the value of the quantity at a particular instant of time. It will be apparent after an understanding of the invention is achieved that the quantity is not restricted to variation with respect to time but is, in fact, restricted only to variations with respect to some other quantity which may be mathematically related to time. At the output of the converter a continuous analog signal is provided which is updated to indicate gradual changes toward the number which will appear at the end of each two-second interval of time.

FIG. 4 contains a simple block diagram of functional units of the converter. As previously mentioned, counting decoders are employed to convert the digital numbers to analog signals, and interpolation is achieved by controlling these counting decoders with pulse generators, the signals from which are modified in accordance with the difference between successive numbers stored in the counters. FIG. 4 generally illustrates the interrelation of elements in the invention. It comprises a coarse counter 410 and a fine counter 411. Data generator 412, which represents the input from a coded signal source, is operative to store data in the coarse and fine counters at predetermined times. After storage, pulse generators 413 and 414 supply driving pulses to counters 410 and 414, respectively, to initiate subtractive counting. When the counters are driven through zero, a pulse is generated on the output leads which may be compared wih the original driving pulse. The time between the first driving pulse and the output pulse is discretely representative of the number stored in the counter by the data generator. Interpolator 415 is controlled by difference generator 416 and in turn controls pulse generators 413 and 414 to either inhibit pulses or effectively generate them at a faster repetition rate, thereby affecting the counter outputs and the analog signals produced thereby. Difference generator 416 may be a device wherein known differences between successive decimal numbers are stored or it may be a device wherein the past differences between the immediately preceding numbers have been determined and stored.

The principles upon which the invention is based will be more clearly understood by consideration of FIG. 7. FIG. 7 is divided into three parts, 7A, 7B, and 7C. In 7A, four waveforms are depicted. The first, labeled "Reference," is representative of reference pulses occurring at a fixed periodic rate. The next waveform, labeled "Counter," is in the form of a saw-tooth and represents the contents of a subtracting counter, the maximum ordinate being representative of the full capacity of the counter and the minimum or zero ordinate being representative of a zero count. As illustrated, the counter initially has a number stored therein. Driving pulses, not illustrated, are continuously applied thereto until a zero is reached, at which time the counter automatically returns to a representation of its maximum capacity and continues counting back down to zero. Detection of the point at which the counter reaches zero and production of a pulse thereat provides a pulse signal modulated in position with respect to the reference pulses. The third waveform, labeled "PPM," represents such a signal. This position modulated signal may be converted in a conventional way to a duration modulated signal if the reference pulse is used in conjunction with the position modulated signal to respectively set and reset a bistable device. The effect of such an arrangement is illustrated in the fourth waveform, labeled "PDM."

The effect of inhibiting driving pulses is illustrated in FIG. 7B. As shown therein, the counter initially contains the same number as was stored in the previous case. Counting commences in response to application of driving pulses. At time *a*, the driving pulses are stopped and this cessation is maintained until time *b* at which point it is recommenced. The effect of inhibiting the driving pulse is to delay the time at which the counter attains a zero count, illustrated in the drawing as *c*. This, in turn, increases the period between the reference pulse and the zero output pulse and effectively makes it appear that the number registered in the counter is greater than that actually registered. Because the reference pulses occur at a fixed rate and the full capacity of the counter is used in each counting cycle, the effective modification in the initially registered number is continued for each count following the inhibition of the driving pulses. The resultant change in output is apparent in both the PPM and PDM waveforms of FIG. 7B.

FIG. 7C illustrates the effect when the count is accelerated. In this case, as shown in the waveform of the counter contents, the rate at which the counter approaches zero increases due to more rapid repetition of the driving pulses. In the figure this period of increased driving rate exists between points *d* and *e*. Obviously, the increased counting rate creates the effect of a smaller number being stored in the register and this effect is continued as the counter continuously recycles itself. The PPM and PDM waveforms of FIG. 7C show the modification of an analog output induced by accelerating the counting rate for a selected period. Thus, by controlling the period of inhibition or acceleration, in accordance with the known or substantially correct rate of change between numbers, it is possible to update information without inserting new data in the counter.

FIGS. 5 and 6 may now be considered. Basically, these figures comprise binary-coded decimal counters 501, 601 and 644 operating in conjunction with control circuits, synchronized clock pulse generators, and input circuits.

In this particular embodiment, each binary-coded decimal counter consists of a decimal stage for each decimal digit. A decimal stage consists of four binary stages connected to repetitively yield an output every tenth count. Thus, counters 501 and 601 each contain three decimal stages and therefore may convert three-digit decimal numbers, and counter 644 contains two decimal stages and therefore may convert two-digit decimal numbers.

All counting is done in synchronism under the control of a master clock or pulse generator. For brevity of illustration, however, a plurality of clock pulse generators are shown in the drawings at the positions where the outputs thereof are used. Each clock pulse generator is identified by the frequency of its output. It should be realized that a master clock generator operating at 5 megacycles, for example, may be used to provide the basic signals and all other signals may be derived therefrom by division.

Input information is made available to the counting decoders by means of coarse input 502, fine input 602, and difference input 603. The numbers to be converted are stored in the respective inputs in binary form and gated into the counters under control of pulse generator 503. The particular form each input circuit takes is not germane to the invention but, as an example, may be similar to that shown in the application of J. A. Githens 3, Serial No. 75,950, filed concurrently herewith. In the Githens' application, the input circuits comprise shift registers which receive the binary-coded decimal numbers in serial form and supply the numbers to the counters in parallel over plural leads 500, 600, and 611, respectively. Each decimal digit requires four input leads to transfer the four binary components thereof from the input to the counter. It should be noted, as previously mentioned, that the last decimal digit of the coarse component input is applied as the first decimal digit of the fine component to fine counter 601 via leads 542.

Difference input 603 may be supplied via a shift register in the same fashion as that described in the Githens' application. If difference information is not available for future data, it may be generated with known circuit techniques by subtracting preceding numbers from one another and encoding the difference in counter 644. This assumes that the rate of change between any two data points is relatively constant. It will be understood that the difference between successive data points may be either positive or negative. Such information is supplied in the form of a signal on either lead 654 or 655.

The operation of pulse generator 503 should also be mentioned before considering the operating sequence of the system. This generator, in keeping with our original assumption, i.e., the data represents values of a quantity for every two-second interval, produces pulses either at a periodic rate of one pulse every two seconds or at chosen intervals under the control of an operator. Since the data is for two-second intervals, this permits storage in the counters and processing with minimum interference.

The actual conversion in the present invention is implemented by subtracting counters 501 and 601 which are driven or counted at a basic 500 kc. rate, the counting pulses for fine counter 601 being derived from an additional decimal counting stage 606 that is driven by a 5-megacycle clock, 612. The purpose of the extra decimal stage is to provide for interpolation. In the absence of any interpolation, the effect of this decimal stage is to divide the 5-megacycle clock pulses by a factor of ten, and therefore provide a 500 kc. output for driving fine counter 601. The interpolation of information into the counters is accomplished by controlling the 5-megacycle input to counter 606 and the 500 kc. input to counter 501. If the sign of the difference is positive, an appropriate number of input pulses is inhibited so that the subtractive counting proceeds at a reduced rate. If the sign is negative, the input pulses are effectively accelerated in repetition rate, thus increasing the rate of subtractive counting.

Interpolating is accomplished in two ways. In the case of counter 601 the counting input is either retarded or accelerated in accordance with whether the subsequent number is larger or smaller, respectively. In the case of counter 501 the counting input is either inhibited or applied to the second binary stage of the counter in accordance with whether the subsequent number is larger or smaller, respectively. In effect, this difference in interpolation technique affords finer granularity of output from fine counter 601 than from coarse counter 501.

In FIGS. 5 and 6, the interpolation control circuitry comprises RATE GATES 627, 628 and 629 and counters 606 and 531. These basic components in combination with clock pulse generators and a variety of logic gates provide the unique steering of counting pulses which renders the invention's objectives attainable. The cited RATE GATES function to translate the difference information obtained from difference counter 644 into gates which are instrumental in inhibiting or passing the counting pulses from generators 537 and 612 for selected periods of time. The pulses from generator 537, which are passed, are used to drive additive counter 531 to control the interpolation of data into coarse counter 501. The pulses from generator 612 are selectively passed to either the first or second binary stage of counter 606 to control the rate at which counting pulses are applied to fine counter 601.

If it is assumed that a number is stored in counters 501 and 601 and also that a number designating the difference between the stored number and the next number to be converted is stored in counter 644, operation of the circuit may be analyzed. The sequence of operation is initiated when START GATE flip-flop 543 in the lower left quadrant of FIG. 5 is switched to a "1" state. This starts conversion of the difference data by producing a signal on leads 545 and 546 which is applied to the input of AND 624. The next occurring 50 kc. clock pulse from generator 625 passes through AND 624 and sets COUNT RATE flip-flop 626 to the "1" state thereby energizing lead 637. Energization of lead 637 enables AND 639 to pass the next occurring 5-megacycle clock pulse from generator 638, which clock pulse is applied to drive difference counter 644. It will be recalled that counter 644 registers a number representative of the difference between the number presently recorded in coarse and fine counters 501 and 601 and that which will follow. The output connections of counter 644 comprise: leads from the "0" output of each stage of the counter but the first; a lead from the "1" output of the first stage; and a lead from 5-megacycle clock 638. Thus, when the counter reaches the binary number 0000 0001 and the next driving pulse arrives to set the counter to zero, all leads on the input of AND 641 are energized and consequently an output pulse appears on lead 642. It will be recognized that the output pulse appearing on lead 642 occurs at a time removed from the time of initiation, by a period discretely representative of the number originally stored in counter 644 and, consequently, by comparison with the initial driving pulse, represents a pulse postion modulated signal. This basic scheme is used in all of the subtractive counters.

The conversion of numbers stored in counters 501 and 601 is also initiated by the signal appearing on start lead 545 which is transmitted via lead 532 to enable AND 528 to pass the next occurring 500-cycle pulse from clock pulse generator 529. This pulse sets count flip-flop 527 thereby producing a signal on lead 530 which is applied via lead 544 to AND gates 512, 513, 613, and 614. These gates control the driving pulses which are applied to subtractive counters 501 and 601. Thus, all three subtraction counters are put into operation in response to a single start gate signal. The particular gate through which the drive pulses are applied is determined by the interpolation circuitry which will now be considered.

The 50 kc. pulse from clock generator 625 which sets COUNT RATE flip-flop 626 and thereby initiates counting in subtractive counter 644, simultaneously enables the setting of rate gate flip-flop 627 and 629 via AND gates 631 and 633. By applying a signal on one input of each of these AND gates, the next clock pulse generated by 5-cycle clock generator 634 and 50-cycle clock generator 636, respectively, is gated through to set the respective flip-flops. It will be noted that when flip-flop 629 is in the "1" state, a signal is applied to the input of AND 616, the other input thereof being applied via lead 653 from the "1" output of polarity flip-flop 643. As previously mentioned, the polarity of the difference between successive numbers is indicated by energization of either lead 654 or lead 655. The convention adopted will be as follows: when lead 654 is energized, enabling the setting of POLARITY flip-flop 643, the difference between numbers being converted is negative; when lead 655 is energized enabling the resetting of POLARITY flip-flop 643 the difference between numbers being converted is positive.

If it be assumed that the difference is negative, energization of lead 653, in conjunction with flip-flop 629 residing in a "1" state, will act through AND 616 to produce a signal on lead 615 which is applied to an input of AND 613. The coincidence of signals from lead 615 and 544 enables AND 613 to pass 5-megacycle clock pulses from generator 612. These clock pulses are applied via lead 609 to the second binary stage of counter 606. It will be understood that application of pulses to the second stage will cause the entire decimal counter to reach a 10 count twice as fast as if the pulses were applied to the first stage. When the output pulse appears on lead 642, RATE GATE flip-flop 629 is reset to zero. The effect of this is to remove the signal on lead 615 and apply a signal on lead 619. At this time, therefore, the clock pulses from clock pulse generator 612 are gated through AND 614 and via lead 610 to the first stage of decimal counter 606 producing an output on lead 651 at a rate of 500 kc. Examining the circuitry, it will be apparent that the maximum duration between initiation of counting in counter 644 and the appearance of a pulse on lead 642 is 20 microseconds and this pulse applied via flip-flop 629 has a repetition of 50 c.p.s. Thus, assuming a change of data every two seconds, one-hundred times each data interval, as many as twenty 5-megacycle pulses may be subtracted at twice the regular rate from the fine counter input.

In the event the difference between numbers is positive, i.e., succeeding numbers are larger, during the period between initiation of counting and application of a pulse on lead 642 to gate flip-flop 629, neither AND 613 nor AND 614 will be enabled and consequently no pulses will be applied to drive counter 606. In this case too, it will be seen that the inhibition period of the 5-megacycle clock pulses from generator 612 may maximally reach 20 microseconds per period, 50 times per second.

AND 648 is connected to the output of fine counter 601 to provide an output on lead 649 when the state of the fine counter is 0000 0000 0001 and the next driving pulse appears on lead 651. Therefore, a pulse on lead 649 is indicative of the counter going through zero. Comparison of this pulse with the time of initiation yields an analog output discretely representative of the number stored in the fine counter as modified by interpolated difference data.

Because the rate information is being used to modify fine counter 601, means must also be provided for updating coarse counter 501. To provide the proper weighting, the signal on lead 642 is transposed and the effect thereof transmitted five times per second over lead 623. This is achieved by means of RATE GATE flip-flop 627 which is initially set via AND 631 by 5-cycle clock pulse generator 634 and is subsequently reset by the pulse on lead 642. A PDM pulse is thus generated on lead 623, the duration of which is directly determined by the time of appearance of the signal on lead 642. The PDM signal on lead 623 may be considered to be a gate pulse occurring five times per second. This gate is converted to a pulse train of 500 kc. pulses, the number of which represents the duration of the gate. Since the maximum duration of the gate is 20 microseconds, as previously explained, the pulse train may contain as many as ten pulses. The conversion is accomplished in AND 535 which has as inputs, the count signal appearing on lead 530, the gate signal on lead 623, and pulses from 500 kc. clock generator 537 delayed by delay 536. Delay 536 is interposed between the clock pulse generator and the logic gate to provide an effective round-off and is only of one-microsecond duration. The pulse train appearing on lead 534 is applied to counter 531 which comprises a single decimal stage.

Counter 531 is additive rather than subtractive. An output of each of its stages is examined by AND 538 which detects a 9 (binary 1001) coupled with the occurrence of the next input pulse. It will be understood that this condition can occur five times per second producing a signal on lead 539. Such a signal due to the action of inverter 514 inhibits one pulse from 500 kc. clock generator 511 and thereby increases the duration of the output of coarse counter 501. Normally, pulses from 500 kc. clock generator 511 are applied through AND 513 to the first stage of coarse counter 501, AND 513 being enabled due to the absence of a pulse on lead 539 and due to the presence of a signal from count flip-flop 527. If the difference is of negative polarity, as previously described, a signal appears on lead 653 which is applied to one of the inputs of AND 512. In this case any signal appearing on lead 539 enables gate 512 to pass a driving pulse from 500 kc. clock 511 to the second stage of coarse counter 501, doubling the subtractive rate and thereby decreasing the duration of the output thereof.

Whereas the output of fine counter 601 was zero-detected by a simple AND gate 648, in the case of coarse counter 501, since the interpolation pulses enter directly into stages being zero-detected, several additional elements are required to obtain the desired output indication. AND 506 has inputs from the "0" outputs of all stages with the exception of the first two, and thus produces a signal on lead 547 when all of these stages are in a "0" state. AND 507 is arranged to produce an output signal on lead 548 whenever lead 547 is energized, the second stage is in the "1" state, the first stage is in the "0" state, and a double rate input pulse is applied via AND 512. AND 508 is arranged to produce an output on lead 549 whenever lead 547 is energized, the second stage is in the "0" state, the first stage is in the "1" state, and either the next normal or double rate input pulse is applied, the latter two conditions being detected via OR 509. The pulses appearing on leads 548 or 549 are transmitted through OR 516 and provide a coarse analog output on lead 550 discretely representative of the number stored in the coarse counter.

In order to convert the pulse position modulated signals appearing on leads 550 and 649 into PDM signals, flip-flops 517 and 647 are provided. These flip-flops are initially set under control of 500-cycle clock generators 518 and 645, respectively, and are reset upon occurrence of the output pulses from the counters appearing on leads 550 and 649. Consequently, the duration of the "set" condition is a discrete representation of the number registered in each of the counters.

It was initially assumed that numbers were registered in the counters when START GATE flip-flop 543 was switched to the "1" state, generating a start signal on lead 545. When new numbers are to be inserted in the counters for conversion, it must be done without introducing discontinuities in the outputs. This may be done if the new information is inserted after the counters have gone through zero and before the 500-cycle reference pulse. The procedure is complicated because the interval may be quite short if the numbers being converted are large or zero.

The insertion of new information in the counters is generally under the control of pulse generator 503 which, as previously mentioned, either produces a pulse automatically every two seconds or at chosen intervals under the direct control of an operator. When a pulse is produced, it is first applied through inverter 504 and over lead 510 to inhibit AND gates 515 and 646, thereby inhibiting the setting of coarse and fine PDM flip-flops 517 and 647, respectively. Thus, when these flip-flops are reset to "0" upon occurrence of zero in the counters, information may be transferred to the coarse and fine counters. The presence of such a "0" state is transmitted via AND 519 and lead 523 to an input of AND 521. A similar arrangement at the output of AND 641 insures that difference counter 644 has just passed through the "0" state. This is transmitted via lead 621 when rate gate flip-flop 628 is reset by an output signal on lead 642. Coincidence of signals on leads 621 and 523 produce an output from AND 521 which is applied to AND 522. AND 522 is also responsive to the original pulse delayed by element 520. Thus, when the counters are ready to receive new information, a pulse is passed by AND 522 which is applied over lead 541 to reset start gate 543 and thereby withdraw the start signal on lead 545. Simultaneously, the output pulse from AND 522 is applied over lead 526 to clear all of the counting stages by resetting them to zero. The pulse from AND 522 is also applied through delay 524 and thence over lead 525 to enable AND gates 505, 605, 617, 618, and 620 to transfer the information from inputs 502, 602, and 603 into the counters. The gating pulse is then applied through delay 540 to the set terminal of START GATE flip-flop 543, switching that flip-flop to the "1" state and thereby initiating conversion once again.

The foregoing description describes one form the invention may assume. It is understood that modifications within the capabilities of one skilled in the art may be made without departing from the spirit or scope of the invention. For example, although binary-conded decimal subtracting counters were employed herein, the invention is equally applicable to additive counters irrespective of the radix of the numerical system employed.

What is claimed is:

1. A pulse counter having a plurality of bistable stages interconnected to switch the succeeding stage when the state of the preceding stage switches in a predetermined direction, each of said stages being switchable in response to a switching pulse, means for setting each of said stages to register numbers in said counter in accordance with particular permutations of the states of said stages, output means controlled by said pulse counter and responsive to produce an output signal when the number registered therein is of a preselected value, a switching pulse generator operating at a fixed pulse repetition rate, means connecting said switching pulse generator to said pulse counter, means for producing a signal discretely representative of the difference between successively registered numbers, and inhibit means responsive to said signals for controlling said switching pulse generator and being operative to block different ones of said pulses, thereby modifying the time at which said output means produces an output signal.

2. A counter arranged to change the number registered therein by one unit in response to the application of a pulse, a plurality of bistable devices each switchable in response to a pulse and operative to produce a pulse when the state thereof is switched in a predetermined direction, said devices being interconnected in cascade wherein each device switches its successor and the final device applies any said produced pulse to said counter, means to produce a signal discretely representative of the difference between numbers successively registered in said counter, a generator producing pulses at a fixed rate, means responsive to said signal for selectively applying the pulses produced by said generator to switch the first or second of said plurality of cascaded devices, and output means controlled by said counter and responsive to produce a signal when the number registered therein is of a preselected value.

3. In a counter as defined by claim 2, means for inhibiting the application of the pulses produced by said generator to either the first or second of said plurality of cascaded devices.

4. In a system for converting a series of numbers wherein the difference between each successive pair of numbers is substantially ascertainable, a counter having a plurality of plural-state stages settable to register numbers by particular permutations of the states of said stages and responsive to a pulse to switch appropriate stages to modify the number registered therein by one unit, output means controlled by said counter and operative to produce a signal when the number registered therein is of a preselected value, gating means for producing a gate of duration discretely representative of said difference between each successive pair of numbers, a generator producing pulses at a fixed rate, and means interposed between said counter and said generator and controlled by said gating means to selectively apply pulses to said counter, said means changing the average rate of application of pulses in accordance with the sense of said difference between each successive pair of numbers.

5. In a system for converting a series of numbers into analog representations thereof wherein the difference between each successive pair of numbers is substantially ascertainable, a pulse counter having a plurality of bistable stages interconnected to switch the succeeding stage when the state of the preceding stage switches in a predetermined direction, said stages being switchable in response to a switching pulse, means for setting each of said stages to register numbers in said counter in accordance with particular permutations of the states of the said stages, output means controlled by said pulse counter and responsive to produce a signal when the number registered therein is of a preselected value, a switching pulse generator operating at a fixed pulse repetition rate, gating means for producing a gate of duration discretely representative of said difference between each successive pair of numbers, and means interposed between said pulse counter and said switching pulse generator and controlled by said gating means to selectively apply switching pulses to the first or second stage of said pulse counter, said interposed means inhibiting or accelerating said application of pulses in accordance with the sense of said difference between each successive pair of numbers.

6. In a system for converting binary-coded decimal numbers to pulse position modulated signals representative thereof, a first pulse counter comprising a plurality of bistable stages connected for decimal counting, means for conditioning said bistable stages to represent decimal numbers by particular permutations of the states of said bistable stages, a second pulse counter comprising a plurality of bistable stages connected for decimal counting, a pulse generator connected to said second pulse counter to cause counting of the pulses applied, said second pulse counter delivering a pulse to said first pulse counter upon occurrence of every *n*th count, means for inhibiting a fixed number of said applied pulses thereby reducing the repetition rate of pulses applied to said first counter, means for gating said applied pulses to a different stage of said second counter for a fixed period of time, thereby increasing the repetition rate of pulses applied to said first counter, and gating means connected to individual stages of said first counter to yield an output upon occurrence of a particular permutation of states of said stages.

7. In a system for converting a series of binary-coded decimal numbers into analog representations thereof wherein the difference between each successive pair of numbers is substantially ascertainable and said binary-coded decimal numbers are divisible into coarse and fine components, a first pulse counter having a plurality of bistable stages interconnected to switch the succeeding stages when the state of the preceding stage switches in a predetermined direction, said stages being switchable in response to a pulse, means for setting each of said stages to register the coarse component of a number in said first pulse counter in accordance with particular permutations of the states of said stages, first output means controlled by said first pulse counter and responsive to produce a signal when the number registered therein is of a preselected value, a second pulse counter having a plurality of bistable stages interconnected to switch the succeeding stages when the state of the preceding stage switches in a predetermined direction, said stages being switchable in response to a pulse, means for setting each of the stages of said second pulse counter to register the fine component of a number in said second pulse counter in accordance with particular permutations of the states of said stages, second output means controlled by said second pulse counter and responsive to produce a signal when the number registered therein is of a preselected value, a third pulse counter having a plurality of bistable stages interconnected to switch the succeeding stages when the state of the preceding stage switches in a predetermined direction, said stages being switchable in response to a pulse, means for setting each of said stages in said third pulse counter to register said difference between each successive pair of numbers, third output means controlled by said third pulse counter and responsive to provide a signal when the number registered therein is of a preselected value, a first pulse generator producing pulses at a fixed rate connected to the first stage of said third pulse counter, a second pulse generator producing pulses at a fixed rate, means connected between said second pulse generator and said second pulse counter and controlled by the signal from said third output means to selectively inhibit or accelerate the application of pulses to said second pulse counter in accordance with the sense of said difference between successive pairs of numbers, a third pulse generator producing pulses at a fixed rate, and means connected between said third pulse generator and said first pulse counter and controlled by the signal from said third output means to selectively inhibit or apply the pulses produced by said third pulse generator to the first or second of said plurality of bistable stages.

References Cited by the Examiner

UNITED STATES PATENTS

| | | | |
|---|---|---|---|
| 2,853,235 | 9/58 | Brinster et al. | 235—164 |
| 2,887,653 | 5/59 | Myers | 235—154 XR |
| 2,986,728 | 5/61 | Hinckley | 235—164 XR |

OTHER REFERENCES

Cohen; A Formal Procedure for the Logical Design of an Optimum Binary Counter, Proc. of the Nat. Electronics Conf., 1954, pp. 523 to 532 (page 524 relied on), 235/92 E.

MALCOLM A. MORRISON, *Primary Examiner.*

WALTER W. BURNS, *Examiner.*